No. 853,235. PATENTED MAY 14, 1907.
J. GILMER.
GIN RIB.
APPLICATION FILED AUG. 16, 1906.
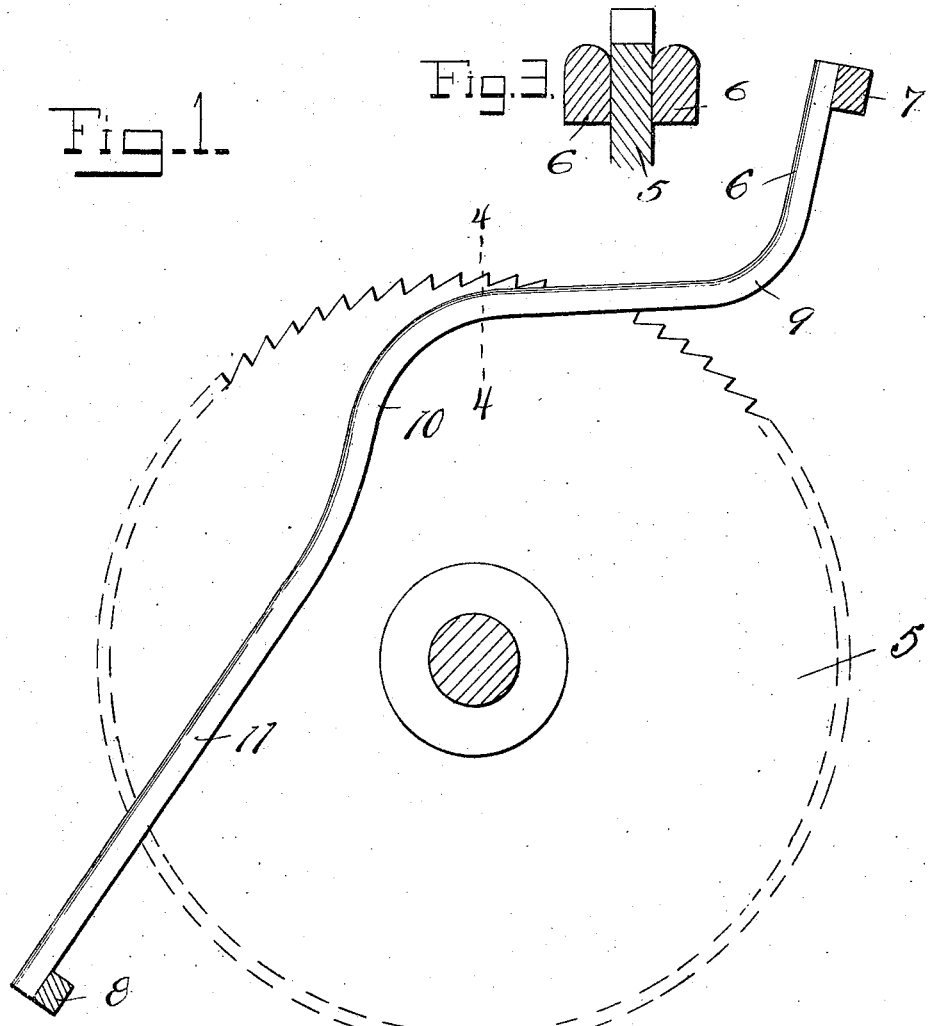
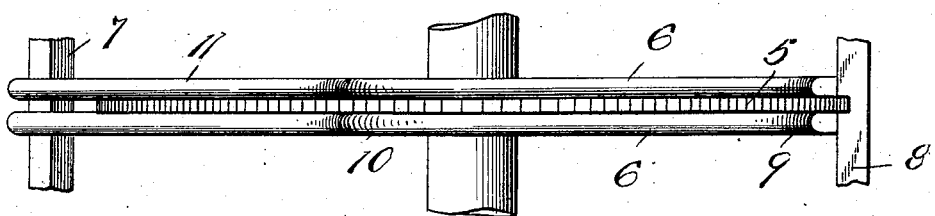

UNITED STATES PATENT OFFICE.

JOSEPH GILMER, OF AUCILLA, FLORIDA, ASSIGNOR OF ONE-HALF TO AMARICUS A. BISHOP, OF AUCILLA, FLORIDA.

GIN-RIB.

No. 853,235.  Specification of Letters Patent.  Patented May 14, 1907.

Application filed August 16, 1906. Serial No. 330,877.

*To all whom it may concern:*

Be it known that I, JOSEPH GILMER, a citizen of the United States, residing at Aucilla, in the county of Jefferson, State of Florida, have invented certain new and useful Improvements in Gin-Ribs; and I do hereby declare the following to be a full, clear, and exact description of the invention, such as will enable others skilled in the art to which it appertains to make and use the same.

This invention relates to gin ribs, and has for its object to provide a rib of such construction that the cotton seeds will not be broken, and which will permit delivery of the lint in a whole condition. The present construction of ribs for this purpose are mounted in such a manner that a line drawn tangentially to the gin-saw at the point where it passes between the ribs will be in a plane at right-angles to the plane of this portion of the rib, or, in other words, the cotton is forced against the ribs in a straight line and the seeds are hence broken and the lint drawn and otherwise injured. The rib embodied in my invention is, however, of such shape that that portion which lies beyond the periphery of the gin-saw, will be located in a plane substantially tangential to the saw at this point, thus preventing injury to the seed and the lint, and, furthermore, the upper edges of the ribs are rounded transversely to further insure against injury.

In the accompanying drawings—Figure 1 is a side elevation of a gin-saw showing the relative position of one of my ribs with respect thereto. Fig. 2 is a top plan view of the saw and rib. Fig. 3 is a detail vertical transverse sectional view on the line 4—4 of Fig. 1.

Referring more specifically to the drawings, the numeral 5 denotes a gin-saw of any ordinary construction, and 6 the ribs embodied in my invention, which ribs are supported by the usual upper and lower cross-beams 7 and 8, respectively, to which they are secured.

Ribs 6 are each curved downwardly and thence forwardly from the upper beam 7, as at 9, with the upper edges of their forwardly extending portions substantially tangential to the periphery of the related gin-saw 5. From their point of intersection with the periphery of the saws, the ribs are curved downwardly and forwardly, as at 10, and thence slightly inwardly and finally forwardly and downwardly, as at 11. Each rib 6 preferably has its upper edge convexed transversely, so that the seeds as they are separated from the raw-cotton will travel in the channel formed by the meeting upper edge faces of the ribs, and will not be liable to injury either while being separated from the raw material or afterward. Furthermore, it will be understood that the portion 9 of each rib being in a plane tangential with the periphery of the related gin-saw, the seeds will be separated from the lint in a whole state, and that the lint will be carried through the saws, not directly, as has been the case heretofore, but at a more acute angle to the ribs, thus preventing breaking of the lint.

What is claimed, is—

1. In a device of the class described, the combination with a gin saw, of a gin rib having a portion extending upwardly and rearwardly from the saw and tangential thereto, the rib beyond this portion being turned to extend substantially vertically.

2. In a device of the class described, the combination with a gin saw, of a gin rib having the bends 6, 9 and 10 formed therein, that portion of the rib lying between the bends 9 and 10 being tangential to the saw.

In testimony whereof, I affix my signature, in presence of two witnesses.

JOSEPH GILMER.

Witnesses:
A. D. WALKER,
H. D. TAYLOR.